United States Patent
Subramanian et al.

(10) Patent No.: US 8,035,241 B2
(45) Date of Patent: Oct. 11, 2011

(54) WIND TURBINE, CONTROL SYSTEM, AND METHOD FOR OPTIMIZING WIND TURBINE POWER PRODUCTION

(75) Inventors: Balaji Subramanian, Bangalore (IN); Srinivasa Gujju, Bangalore (IN); Vikas Saxena, Bangalore (IN); Vikram Singh Rajput, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/833,416

(22) Filed: Jul. 9, 2010

(65) Prior Publication Data

US 2011/0142619 A1 Jun. 16, 2011

(51) Int. Cl.
H02P 9/48 (2006.01)
(52) U.S. Cl. .......................................... 290/44; 290/55
(58) Field of Classification Search .................... 290/43, 290/44, 54, 55; 322/37
See application file for complete search history.

(56) References Cited

U.S. PATENT DOCUMENTS

| | | | |
|---|---|---|---|
| 7,025,567 B2 | 4/2006 | Wobben | |
| 7,394,166 B2 * | 7/2008 | Teichmann et al. | 290/44 |
| 7,436,083 B2 * | 10/2008 | Shibata et al. | 290/44 |
| 7,437,216 B2 | 10/2008 | Riesberg et al. | |
| 7,522,976 B2 * | 4/2009 | Stommel | 700/287 |
| 7,566,982 B2 * | 7/2009 | Voss | 290/44 |
| 2007/0124025 A1 | 5/2007 | Schram et al. | |
| 2009/0021015 A1 | 1/2009 | Pedersen | |
| 2009/0047116 A1 | 2/2009 | Barbu et al. | |
| 2009/0099702 A1 | 4/2009 | Vyas et al. | |
| 2009/0295165 A1 | 12/2009 | Giguere et al. | |

FOREIGN PATENT DOCUMENTS

WO 2008092462 A2 8/2008

* cited by examiner

*Primary Examiner* — Nicholas Ponomarenko

(74) *Attorney, Agent, or Firm* — James McGinness, Esq.; Armstrong Teasdale LLP

(57) ABSTRACT

A wind turbine includes a generator and a control system. The control system is configured to determine whether a predefined amount of turbulence will be induced to the wind turbine by a wake zone created by a wind turbine upstream thereof. The control system is also configured to adjust at least one constraint of the wind turbine to a first setting if the amount of turbulence is greater than the predefined amount, the constraint affecting power produced by the generator, and to adjust the constraint of the wind turbine to a second setting if the amount of turbulence is not greater than the predefined amount.

20 Claims, 4 Drawing Sheets

US 8,035,241 B2

WIND TURBINE, CONTROL SYSTEM, AND METHOD FOR OPTIMIZING WIND TURBINE POWER PRODUCTION

BACKGROUND OF THE INVENTION

The subject matter described herein relates generally to wind turbines and, more particularly, to a wind turbine, control system, and method to optimize power production from one or more wind turbines within a wind farm.

Generally, a wind turbine includes a rotor that includes a rotatable hub assembly having multiple rotor blades. The rotor blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a tower.

At least some known wind turbines are arranged in localized groups known as wind farms. Generally, each wind turbine is positioned within the wind farm to optimize environmental conditions of the wind farm. For example, the wind turbines may be positioned to reduce or to minimize a wake effect (i.e., a turbulence) of one or more wind turbines. Such wake effects may be caused by wind being diverted around a tower, rotor blades, and/or other components of the wind turbine. However, due to space constraints that may be present within known wind farms, the positioning of the wind turbines may still result in wake effects that are induced to one or more wind turbines. Such wake effects may undesirably result in additional loads induced to the affected wind turbines, which may reduce a lifespan of one or more components of the affected wind turbines.

At least some known wind farms limit or constrain a power production of wind turbines that experience wake effects to prevent turbulence associated with the wake effects from damaging the wind turbines. For example, a wind turbine that is positioned within a wake zone of another wind turbine may be curtailed, or limited in rotational speed and/or power production. Moreover, the affected wind turbine may be prevented from increasing its power production during times of excess power production capability. Such constraints may be programmed into a control system of each wind turbine during a wind farm installation based on estimates of future wind farm conditions. However, one or more wind turbines may not be continuously operational, for example, due to maintenance and/or fault conditions. An operational status of each wind turbine within the wind farm may not be available to the other wind turbines. Accordingly, if one or more wind turbines are non-operational, the power production of other wind turbines may continue to be constrained even though the non-operational wind turbine may generate less turbulence. Such operation may result in a loss of power that may otherwise be produced by the wind turbines.

BRIEF DESCRIPTION OF THE INVENTION

In one embodiment, a wind turbine is provided that includes a generator and a control system. The control system is configured to determine whether a predefined amount of turbulence will be induced to the wind turbine by a wake zone created by a wind turbine upstream thereof. The control system is also configured to adjust at least one constraint of the wind turbine to a first setting if the amount of turbulence is greater than the predefined amount, the constraint affecting power produced by the generator, and to adjust the constraint of the wind turbine to a second setting if the amount of turbulence is not greater than the predefined amount.

In another embodiment, a control system is provided that is configured to be coupled to a first wind turbine and to a second wind turbine positioned upstream of the first wind turbine. The control system is configured to determine whether a predefined amount of turbulence will be induced to the first wind turbine by a wake zone created by the second wind turbine. The control system is also configured to adjust at least one constraint of the first wind turbine to a first setting if the amount of turbulence is greater than the predefined amount, the constraint affecting power produced by the first wind turbine, and to adjust the constraint of the first wind turbine to a second setting if the amount of turbulence is not greater than the predefined amount.

In yet another embodiment, a method for optimizing power production of a wind turbine is provided that includes determining whether a predefined amount of turbulence will be induced to a first wind turbine by a wake zone created by a second wind turbine upstream thereof. At least one constraint of the first wind turbine is adjusted to a first setting if the amount of turbulence is greater than the predefined amount, the constraint affecting power produced by the first wind turbine. The constraint is adjusted to a second setting if the amount of turbulence is not greater than the predefined amount.

DETAILED DESCRIPTION OF THE INVENTION

The embodiments described herein optimize a power production within a wind farm. A first wind turbine determines an operational status of a second wind turbine that is upstream from the first wind turbine. The first wind turbine also determines one or more wind parameters. The first wind turbine uses the determined operational status of the second wind turbine and the wind parameters to determine whether an unacceptable amount of turbulence may be induced to the first wind turbine from the second wind turbine. If an unacceptable amount of turbulence is likely to be induced, the first wind turbine adjusts at least one constraint to a first setting to reduce a power production of the first wind turbine. If an acceptable amount of turbulence is likely to be induced, the first wind turbine adjusts the constraint to a second setting to increase a power production of the first wind turbine. As such, the embodiments described herein protect the first wind turbine from damage and enable the first wind turbine to capture additional energy if the second wind turbine is non-operational.

Figure 1:
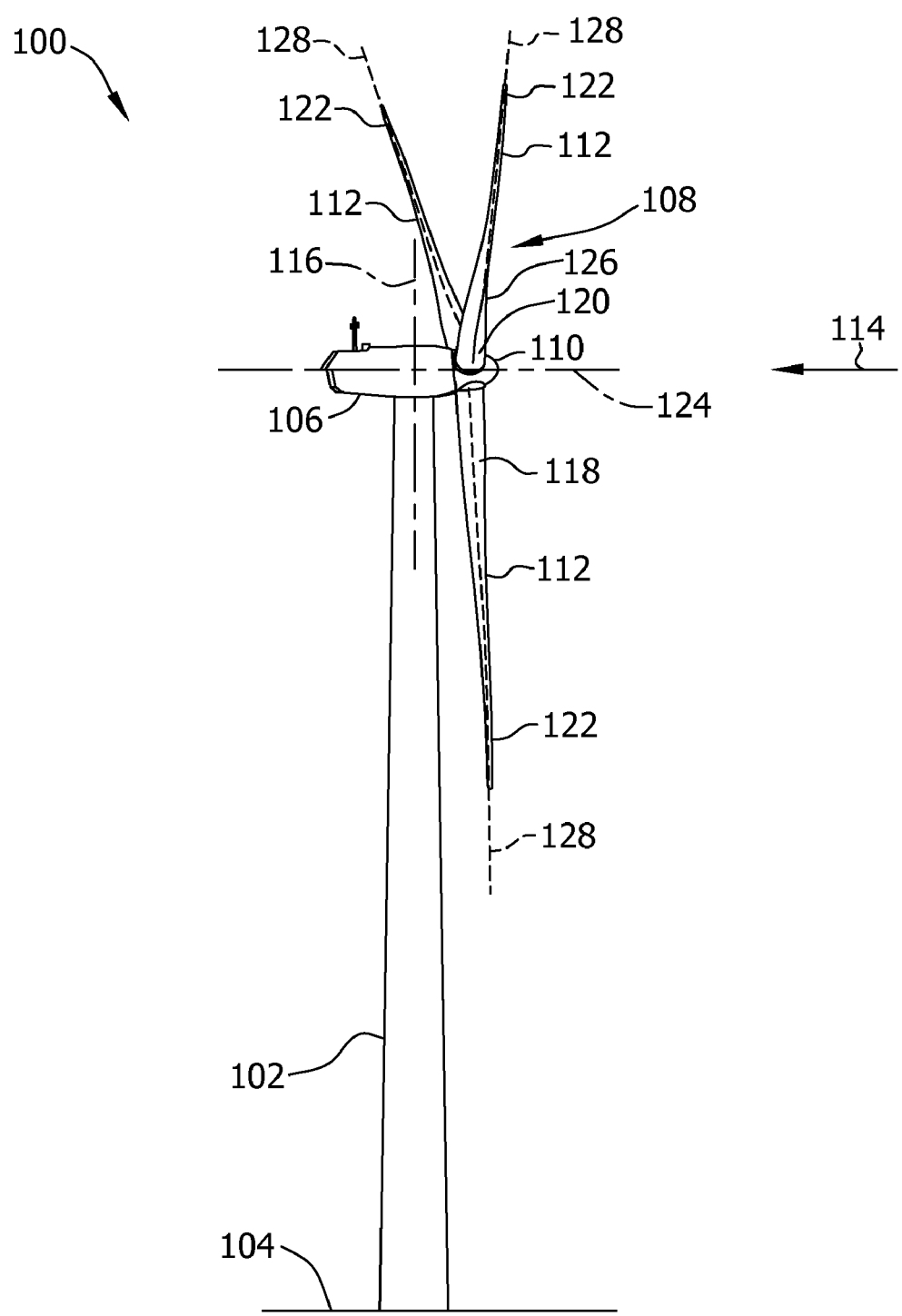
FIG. 1 is a perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
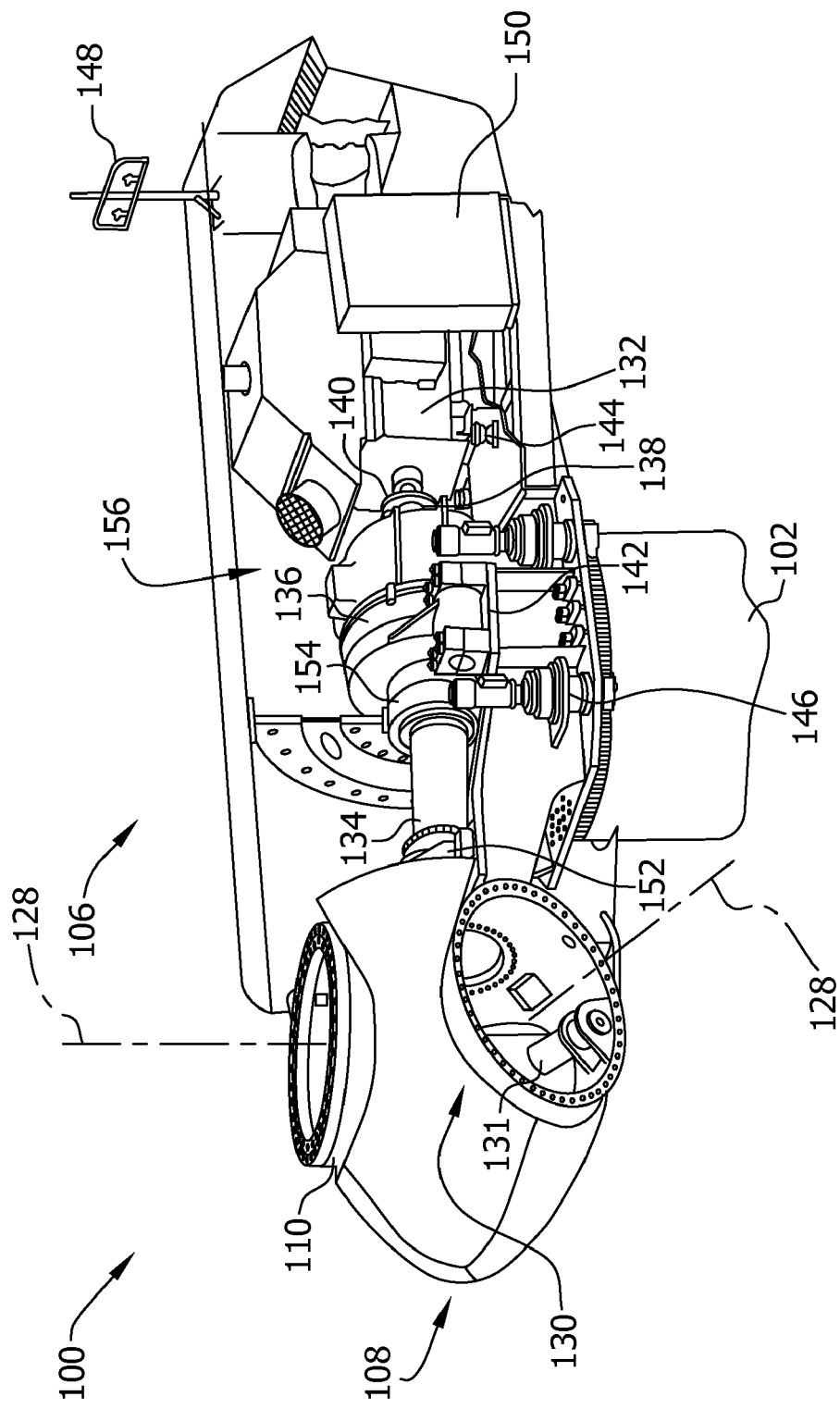
FIG. 2 is a partial sectional view of an exemplary nacelle suitable for use with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 128. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 (shown in FIG. 1) to control the perspective of rotor blades 112 with respect to the direction of wind 114. Nacelle 106 also includes at least one meteorological mast 148 that includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes a forward support bearing 152 and an aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
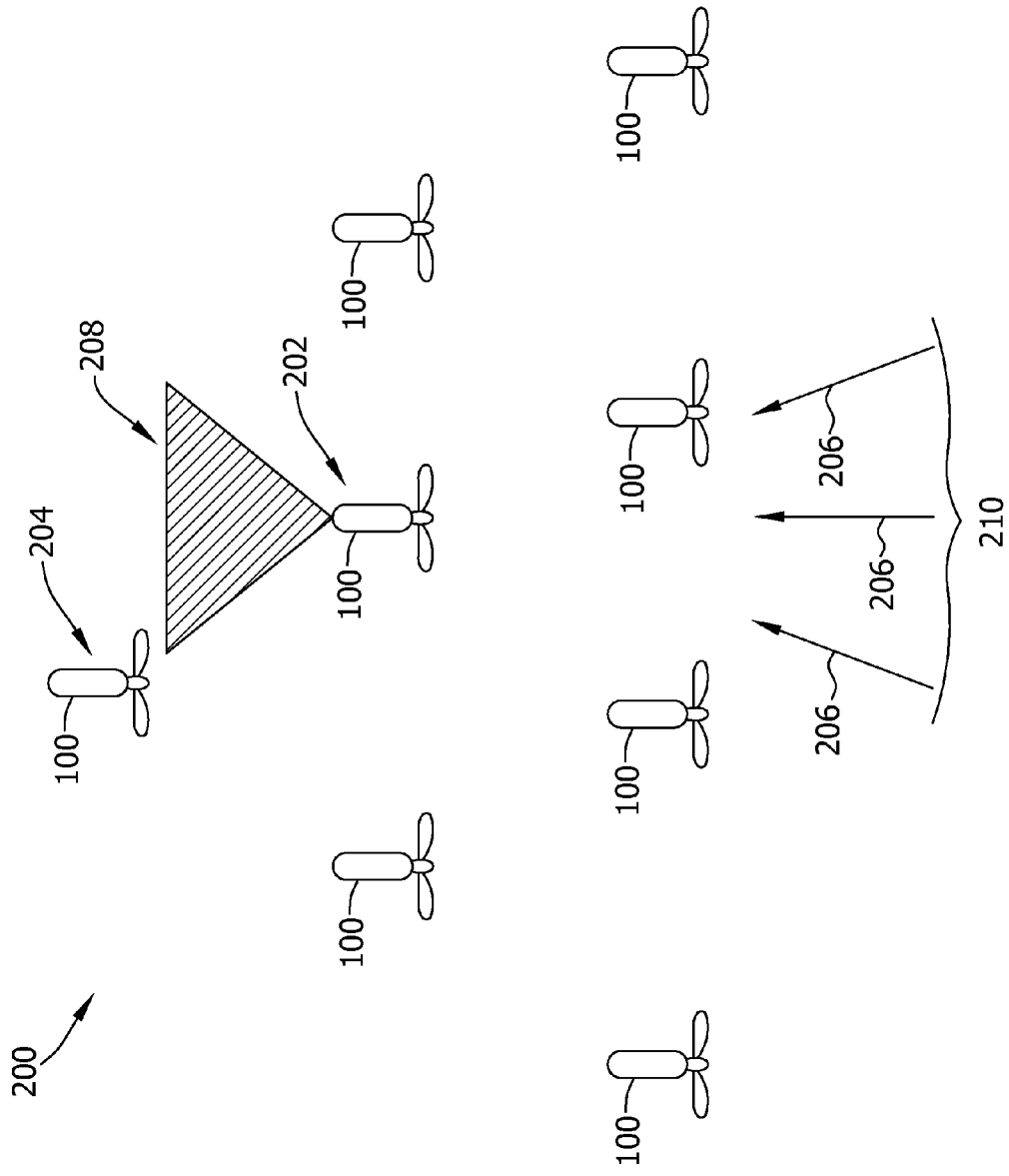
FIG. 3 is a schematic top view of an exemplary wind farm that may include the wind turbine shown in FIG. 1.

FIG. 3 is a top view of an exemplary wind farm 200. In the exemplary embodiment, wind farm 200 includes a plurality of wind turbines 100. More specifically, wind farm 200 includes one or more first, or upstream wind turbines 202 and one or more second, or downstream wind turbines 204 that are positioned downstream from first wind turbine 202 with respect to a wind direction 206. In the exemplary embodiment, wind turbines 100 within wind farm 200 are coupled to each other by a network (not shown) that interfaces with a respective turbine control system 150 (shown in FIG. 2) of each wind turbine 100. More specifically, wind turbines 100 and/or turbine control systems 150 are coupled together by any suitable network type, including a wired and/or a wireless network, that enables each wind turbine 100 and/or turbine control system 150 to transmit and receive data to and from other wind turbines 100 and/or turbine control systems 150 within wind farm 200.

Depending on a layout of wind farm 200, upstream wind turbine 202 may create a wake zone 208 that at least partially affects downstream wind turbine 204. In one embodiment, a list and/or a table of wind directions 206 that will cause upstream wind turbine 202 to create a wake zone 208 that affects downstream wind turbine 204 is programmed and/or stored within turbine control system 150 and/or any suitable component of downstream wind turbine 204. Alternatively, downstream wind turbine 204 receives a notification from a wind farm server (not shown) and/or from any suitable system operatively coupled to downstream wind turbine 204 when a wind direction 206 creates a wake zone 208 that affects downstream wind turbine 204. As used herein, the term "wake zone" refers to an area of increased turbulence downstream from a wind turbine 100 that may be caused by an interaction of rotor blades 112 with wind flowing in one or more wind directions 206 within a wind sector 210. It should be understood that as a wind direction 206 and/or a rotation of rotor blades 112 changes, an orientation and/or a size of wake zone 208 may also change. Moreover, in certain conditions, a plurality of upstream wind turbines 202 may generate one or more wake zones 208 that individually or together affect one or more downstream wind turbines 204. For example, one or more upstream wind turbines 202 may generate a corresponding wake zone 208 that may affect one or more downstream wind turbines 204. Further, adjacent upstream wind turbines 202 may each generate a corresponding wake zone 208 that affects a downstream wind turbine 204.

In the exemplary embodiment, downstream wind turbine 204 monitors an operational status of upstream wind turbine 202 using the network. More specifically, downstream wind turbine 204 transmits a status request to upstream wind turbine 202. Upstream wind turbine 202 receives the status request and transmits a status response to downstream wind turbine 204. The status response may include an indication that upstream wind turbine 202 is operational or is non-operational. More specifically, in the exemplary embodiment, the status response may include a measured rotational speed of rotor 108 (shown in FIG. 1) of upstream wind turbine 202 and/or an amount of time that upstream wind turbine 202 has been operating without an error and/or a fault. Alternatively, if upstream wind turbine 202 is non-operational and is unable to transmit the status response to downstream wind turbine 204, a timeout mechanism may be used by downstream wind turbine 204. More specifically, downstream wind turbine 204 may determine that upstream wind turbine 202 is non-operational if downstream wind turbine 204 does not receive a status response within a predefined time after transmitting the status request.

As used herein, the term "operational" refers to a power production status of a wind turbine generator and/or a rotational status of a wind turbine rotor during wind conditions that enable power to be produced and/or rotation of the rotor. For example, if a wind turbine is producing power and/or if the rotor is rotating, the wind turbine may be operational. In contrast, if the wind turbine is not producing power and/or if the rotor is stationary, such as during maintenance and/or during a fault condition, for example, the wind turbine may be non-operational.

In an alternative embodiment, downstream wind turbine 204 determines an operational status of upstream wind turbine 202 from one or more operational characteristics within a status response received from upstream wind turbine 202, such as, without limitation, a rotor speed, a power output, and/or fault conditions, in combination with a measured wind speed above a cut-in level of upstream wind turbine 202. In another embodiment, wind turbines 100 are coupled to a centralized server, such as the wind farm server that monitors the operational status of each wind turbine 100. In such an embodiment, each wind turbine 100 receives the operational status of at least one other wind turbine 100 from the centralized server.

In the exemplary embodiment, downstream wind turbine 204 uses meteorological mast 148 (shown in FIG. 2) and/or any suitable sensor or device to detect one or more wind parameters. More specifically, downstream wind turbine 204 may detect any suitable wind parameter, such as, for example, a wind speed, a wind direction, a wind density, and/or a wind acceleration that enables wind turbine 204 to operate as described herein.

In the exemplary embodiment, downstream wind turbine 204 uses the received operational status and/or the detected wind parameters to adjust one or more operational parameters and/or to adjust an operation of downstream wind turbine 204. More specifically, in the exemplary embodiment, downstream wind turbine 204 adjusts at least one constraint and/or at least one constraint profile to a first setting if upstream wind turbine 202 is operational and if a detected wind direction 206 indicates that upstream wind turbine 202 will induce an unacceptable amount of turbulence to downstream wind turbine 204. In contrast, if upstream wind turbine 202 is non-operational and/or if the detected wind direction 206 indicates that upstream wind turbine 202 will induce an acceptable amount of turbulence to downstream wind turbine 204, then downstream wind turbine 204 adjusts at least one constraint and/or constraint profile to a second setting that enables downstream wind turbine 204 to produce additional power than downstream wind turbine 204 is able to produce at the first setting. Alternatively, downstream wind turbine 204 implements at least one constraint and/or constraint profile if the amount of turbulence is determined to be unacceptable. Downstream wind turbine 204 removes at least one constraint and/or constraint profile and/or implements a second constraint that is less limiting than a first constraint if the amount of turbulence is determined to be acceptable. In one embodiment, downstream wind turbine 204 may adjust at least one constraint and/or constraint profile to one of a plurality of settings, such as a third setting or a fourth setting, if upstream wind turbine 202 is operational but an amount of turbulence induced to downstream wind turbine 204 is affected by a change in wind direction, a change in the rotor speed of upstream wind turbine 202, a change in the size of wake zone 208, and/or by any suitable condition.

As used herein, the term "constraint" refers to a limitation imposed on a parameter that controls an operation and/or a power generation of wind turbine 100 and/or a component of wind turbine 100. The constraint is a limitation that temporarily overrides a setpoint or other operating limit that may have been imposed on the parameter. A "constraint profile" refers to a plurality of constraints that are associated with each other. Moreover, as used herein, the term "unacceptable" refers to a value or level of a parameter or condition that exceeds a predefined threshold. The term "acceptable" refers to a value or level of a parameter or condition that does not exceed a predefined threshold.

In the exemplary embodiment, the constraint and/or the constraint profile of downstream wind turbine 204 that is adjusted includes adjusting and/or setting limits for a power production, a rotor speed, pitch angle offsets for each rotor blade 112 (shown in FIG. 1), a yaw angle offset, and/or any suitable parameter that enables downstream wind turbine 204 to substantially avoid damage to one or more components due to turbulence that may be induced by upstream wind turbine 202. Moreover, the constraint and/or the constraint profile may include suspending a power production, a rotation of rotor 108, and/or an ability to produce power above a rated limit of downstream wind turbine 204. As such, the constraint and/or the constraint profile affects a power produced by wind turbine 100 and/or by generator 132. In other words, a power production and/or an operation of downstream wind turbine 204 is adjusted based on the received operational status of upstream wind turbine 202. Moreover, it should be understood that each wind turbine 100 within wind farm 200 may be programmed with the constraint profiles and/or the functionality described herein with respect to downstream wind turbine 204 and/or upstream wind turbine 202.

As described herein, wind farm 200 includes upstream wind turbine 202 and downstream wind turbine 204. However, upstream wind turbine 202 and downstream wind turbine 204 may be positioned within any suitable location, such as within different wind farms. Alternatively, upstream wind turbine 202 and/or downstream wind turbine 204 may be individual wind turbines 100 and/or may not be positioned within a wind farm.

Figure 4:
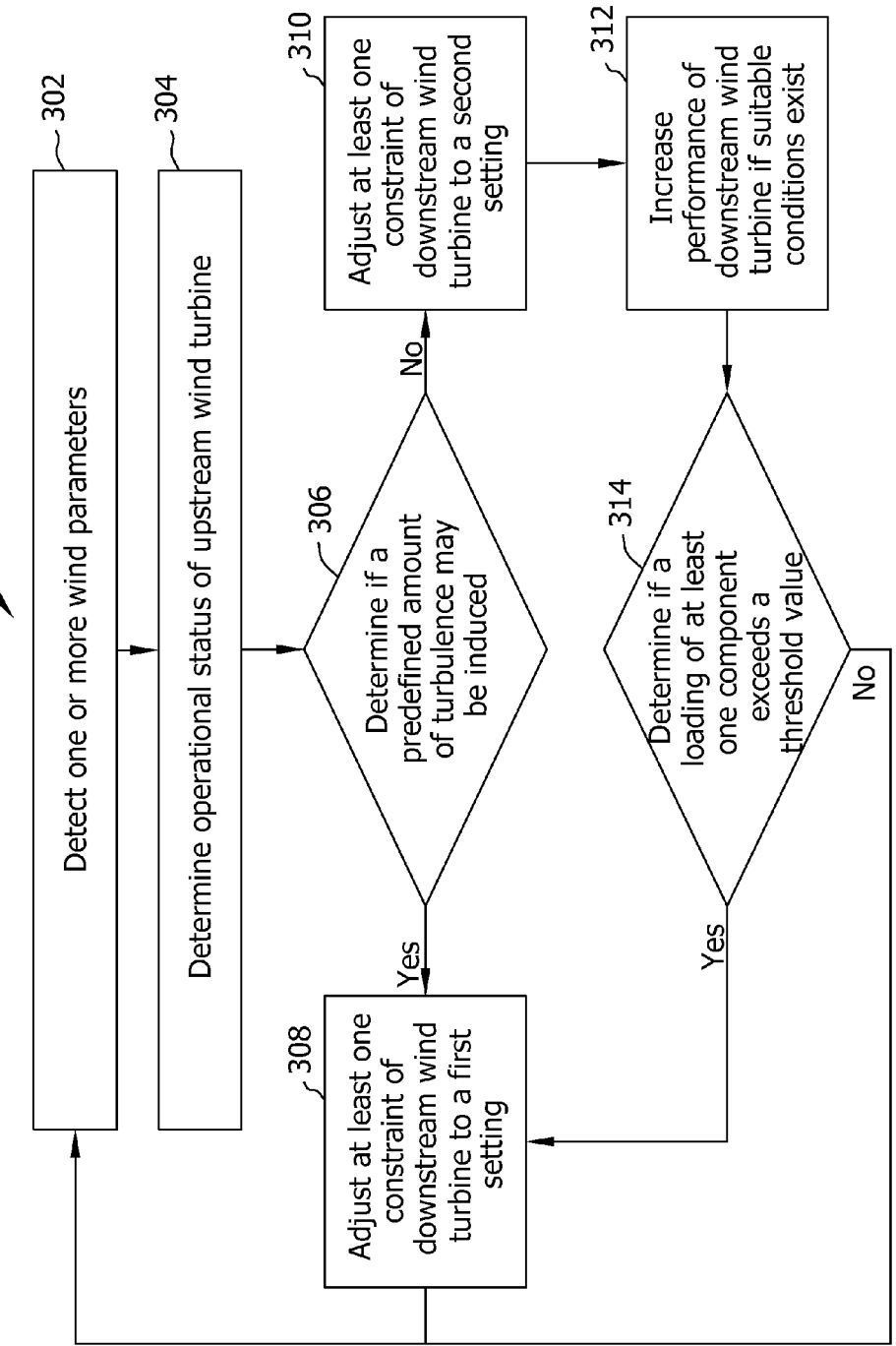
FIG. 4 is a flow diagram of an exemplary method for optimizing a wind turbine suitable for use with the wind turbine shown in FIG. 1 and/or within the wind farm shown in FIG. 3.

FIG. 4 is a flow diagram of an exemplary method 300 of optimizing a wind turbine, such as wind turbine 100 (shown in FIG. 1). In the exemplary embodiment, method 300 is at least partially implemented by turbine control system 150 (shown in FIG. 2) of one or more wind turbines 100, such as downstream wind turbine 204 (shown in FIG. 3). Additionally or alternatively, method 300 is at least partially implemented by a remote system, such as a wind farm server (not shown), for example. One or more wind parameters are detected 302 by meteorological mast 148 (shown in FIG. 2) and/or by any suitable sensor or device. For example, a wind speed, a wind direction, a wind density, a wind acceleration, and/or any suitable wind parameter may be detected 302 to enable method 300 to operate as described herein.

An operational status of an upstream wind turbine 202 (shown in FIG. 3) is determined 304 by receiving a status response from upstream wind turbine 202 and/or by a predefined amount of time elapsing after transmitting a status request from downstream wind turbine 204. Alternatively, an operational status of upstream wind turbine 202 may be determined and/or transmitted to downstream wind turbine 204 by the wind farm server and/or by any suitable method that enables method 300 to operate as described herein.

Downstream wind turbine 204 determines 306 whether a predefined and/or an unacceptable amount of turbulence may be induced by upstream wind turbine 202, based on the detected wind parameters and/or based on the operational status of upstream wind turbine 202. More specifically, if the detected wind parameters indicate that downstream wind turbine 204 is positioned within a wake zone 208 (shown in FIG. 3) of upstream wind turbine 202 and if upstream wind turbine 202 is operational, then downstream wind turbine 204 may determine 306 that an unacceptable amount of turbulence will be induced. At least one constraint and/or constraint profile of downstream wind turbine 204 is adjusted 308 to a first setting, as described more fully above with respect to FIG. 3. After adjusting 308 the constraint, method 300 returns to detecting 302 one or more wind parameters as described above.

In contrast, if the detected wind parameters indicate that downstream wind turbine 204 is not positioned within a wake zone 208 of upstream wind turbine 202 and/or if upstream wind turbine 202 is non-operational, then downstream wind turbine 204 may determine 306 that an unacceptable amount of turbulence may not be induced. In other words, downstream wind turbine 204 may determine 306 that no turbulence or that an acceptable amount of turbulence may be induced. Accordingly, downstream wind turbine 204 adjusts 310 at least one constraint and/or constraint profile to a second setting that is less limiting than the first constraint setting that was previously or is currently implemented on downstream wind turbine 204. As such, a power production of downstream wind turbine 204 may be increased.

Moreover, if downstream wind turbine 204 determines that suitable wind conditions and/or an excess power production capacity exists based on the detected wind parameters, a performance and/or a power production of downstream wind turbine 204 may be increased 312 above a first limit, such as a default limit, of downstream wind turbine 204. For example, downstream wind turbine 204 may implement a control system and/or any suitable system that enables downstream wind turbine 204 to increase 312 power production above a default limit of downstream wind turbine 204. As used herein, the term "default limit" refers to a maximum steady state value for an associated operating condition of wind turbine 100 and/or of one or more components of wind turbine 100. In one embodiment, one or more default limits of wind turbines 100 are preset during an installation of wind farm 200 and/or wind turbines 100.

If downstream wind turbine determines 314 that a loading of at least one component of downstream wind turbine 204 exceeds a predefined threshold value, such as a predefined loading limit value, downstream wind turbine 204 adjusts 308 at least one constraint and/or constraint profile as described above to reduce the loading. In the exemplary embodiment, downstream wind turbine 204 adjusts 308 the constraint and/or constraint profile to the first setting. Alternatively, downstream wind turbine 204 adjusts 308 the constraint and/or constraint profile to another suitable setting that enables downstream wind turbine 204 to suitable reduce a loading of one or more components. In the exemplary embodiment, if downstream wind turbine 204 determines 314 that the loading of the components of downstream wind turbine 204 do not exceed the predefined threshold values, downstream wind turbine 204 continues operating with the constraints at the first setting. After determining 314 whether the loading exceeds the threshold value, method 300 returns to detecting 302 wind parameters as described above.

A technical effect of the systems and method described herein includes at least one of: (a) determining whether a predefined amount of turbulence may be induced to a first wind turbine by a wake zone created by a second wind turbine upstream thereof; (b) adjusting at least one constraint of a first wind turbine to a first setting if an amount of turbulence is greater than a predefined amount, the constraint affecting power produced by the first wind turbine; and (c) adjusting at least one constraint of a first wind turbine to a second setting if an amount of turbulence is not greater than a predefined amount.

The above-described embodiments provide an efficient and cost-effective method of optimizing wind turbine power production. A first wind turbine determines an operational status of a second wind turbine that is upstream from the first wind turbine. The first wind turbine also determines one or more wind parameters. The first wind turbine uses the determined operational status of the second wind turbine and the wind parameters to determine whether an unacceptable amount of turbulence may be induced to the first wind turbine from the second wind turbine. If an unacceptable amount of turbulence is likely to be induced, the first wind turbine adjusts at least one constraint to a first setting to reduce a power production of the first wind turbine. If an acceptable amount of turbulence is likely to be induced, the first wind turbine adjusts at least one constraint to a second setting to increase a power production of the first wind turbine. As such, the embodiments described herein protect the first wind turbine from damage and enable the first wind turbine to capture additional energy if the second wind turbine is non-operational.

Exemplary embodiments of a wind turbine, a control system, and a method for optimizing a wind turbine are described above in detail. The wind turbine, control system, and method are not limited to the specific embodiments described herein, but rather, components of the wind turbine and/or control system and/or steps of the method may be utilized independently and separately from other components and/or steps described herein. For example, the wind turbine may also be used in combination with other wind farms and methods, and is not limited to practice with only the wind farm and method as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine, comprising:
    a generator; and,
    a control system configured to:
        determine whether a predefined amount of turbulence will be induced to said wind turbine by a wake zone created by a wind turbine upstream thereof;
        adjust at least one constraint of said wind turbine to a first setting if the amount of turbulence is greater than the predefined amount, the at least one constraint affecting power produced by said generator; and,
        adjust the constraint of said wind turbine to a second setting if the amount of turbulence is not greater than the predefined amount.

2. A wind turbine in accordance with claim 1, wherein said control system determines an operational status of the upstream wind turbine to determine whether the predefined amount of turbulence will be induced to said wind turbine.

3. A wind turbine in accordance with claim 2, wherein said control system is further configured to adjust the constraint of said wind turbine to the first setting if the determined operational status indicates that the upstream wind turbine is operational.

4. A wind turbine in accordance with claim 3, wherein said control system is further configured to adjust the constraint of said wind turbine to the second setting if the determined operational status indicates that the upstream wind turbine is non-operational.

5. A wind turbine in accordance with claim 4, wherein said control system is further configured to increase a power production of said wind turbine above a first limit if the determined operational status indicates that the upstream wind turbine is non-operational.

6. A wind turbine in accordance with claim 4, wherein said control system is further configured to adjust at least one constraint of said wind turbine if a loading of at least one component of said wind turbine exceeds a predefined threshold value.

7. A wind turbine in accordance with claim 1, wherein said control system determines a wind direction to determine whether the predefined amount of turbulence will be induced to said wind turbine.

8. A control system configured to be coupled to a first wind turbine and to a second wind turbine positioned upstream of the first wind turbine, said control system further configured to:
    determine whether a predefined amount of turbulence will be induced to the first wind turbine by a wake zone created by the second wind turbine;
    adjust at least one constraint of the first wind turbine to a first setting if the amount of turbulence is greater than the predefined amount, the constraint affecting power produced by the first wind turbine; and,
    adjust the constraint of the first wind turbine to a second setting if the amount of turbulence is not greater than the predefined amount.

9. A control system in accordance with claim 8, wherein said control system determines an operational status of the second wind turbine to determine whether the predefined amount of turbulence will be induced to the first wind turbine.

10. A control system in accordance with claim 9, wherein said control system is further configured to adjust the constraint of the first wind turbine to the first setting if the determined operational status indicates that the second wind turbine is operational.

11. A control system in accordance with claim 10, wherein said control system is further configured to adjust the constraint of the first wind turbine to the second setting if the determined operational status indicates that the second wind turbine is non-operational.

12. A control system in accordance with claim 11, wherein said control system is further configured to increase a power production of the first wind turbine above a first limit if the determined operational status indicates that the second wind turbine is non-operational.

13. A control system in accordance with claim 11, wherein said control system is further configured to adjust at least one constraint of the first wind turbine if a loading of at least one component of the first wind turbine exceeds a predefined threshold value.

14. A control system in accordance with claim 11, wherein said control system is further configured to transmit a status request to the second wind turbine to determine whether the second wind turbine is non-operational.

15. A method for optimizing power production of a wind turbine, said method comprising:
    determining whether a predefined amount of turbulence will be induced to a first wind turbine by a wake zone created by a second wind turbine upstream thereof;
    adjusting at least one constraint of the first wind turbine to a first setting if the amount of turbulence is greater than the predefined amount, the constraint affecting power produced by the first wind turbine; and,
    adjusting the constraint of the first wind turbine to a second setting if the amount of turbulence is not greater than the predefined amount.

16. A method in accordance with claim 15, further comprising determining an operational status of the second wind turbine to determine whether the predefined amount of turbulence will be induced to the first wind turbine.

17. A method in accordance with claim 16, further comprising adjusting the constraint of the first wind turbine to the first setting if the determined operational status indicates that the second wind turbine is operational.

18. A method in accordance with claim 16, further comprising adjusting the constraint of the first wind turbine to the second setting if the determined operational status indicates that the second wind turbine is non-operational.

19. A method in accordance with claim 16, further comprising increasing a power production of the first wind turbine above a first limit if the determined operational status indicates that the second wind turbine is non-operational.

20. A method in accordance with claim 18, further comprising transmitting a status request to the second wind turbine to determine whether the second wind turbine is non-operational.

* * * * *